INVENTORS.
M. C. BURK
R. L. KINDRED
F. W. KARASEK

BY Young & Quigg

ATTORNEYS

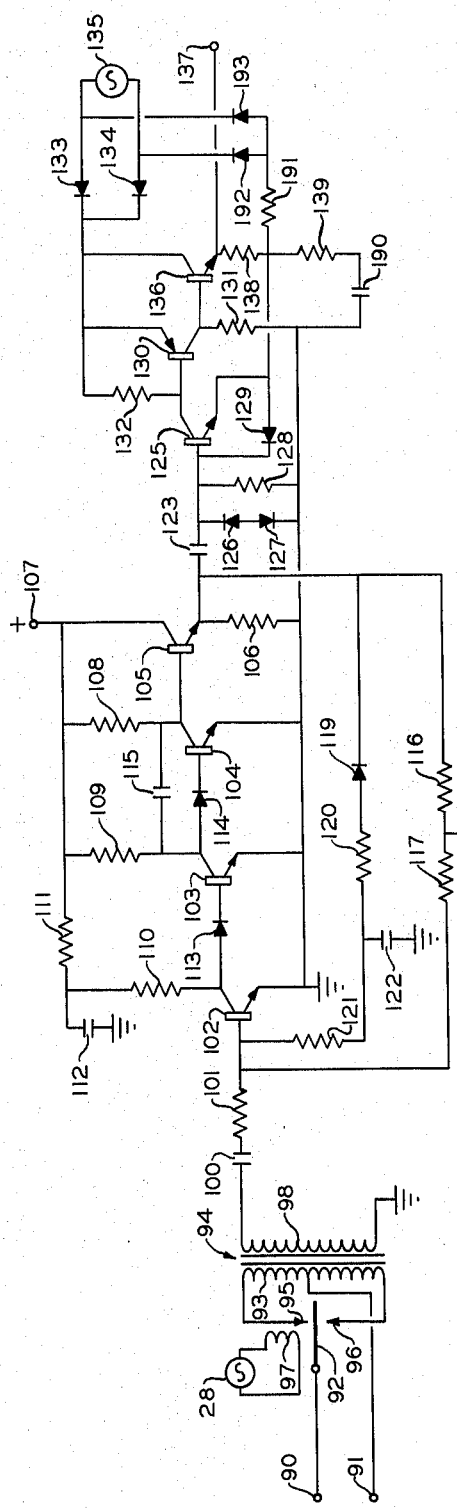

INVENTORS.
M. C. BURK
R. L. KINDRED
F. W. KARASEK

BY Young & Quigg
ATTORNEYS 3,242,327
ANALYSIS AND RATIO COMPUTING
APPARATUS
Marvin C. Burk, Raymond L. Kindred, and Francis W. Karasek, all of Bartlesville, Okla., assignors to Phillips Petroleum Company, a corporation of Delaware
Filed Oct. 27, 1961, Ser. No. 148,081
7 Claims. (Cl. 235—183)

This invention relates to the analysis of fluid mixtures. In another aspect it relates to improved electrical signal integrating apparatus. In still another aspect it relates to signal ratio measuring apparatus.

Several types of analyzers have been developed in recent years which are capable of providing output signals representative of individual constituents of fluid mixtures being analyzed. Chromatographic analyzers are examples of such analysis instruments. A fluid mixture is separated into its individual constituents by being directed through a material that selectively retards the passage of these individual constituents. A property representative of the composition of the effluent from the material is measured and signals representative thereof are established. In some analysis procedures, it is desirable to integrate these signals over preselected time intervals to provide output signals suitable for control purposes. A mass spectrometer is another type of analyzer which can provide a series of output signals in sequence which represent constituents of a mixture being analyzed.

In some types of chemical processes, it is desirable to maintain a predetermined ratio between the concentrations of two constituents fed to a reactor or other process zone. One such example occurs in the production of sulfur by a two-step process which comprises oxidizing hydrogen sulfide to produce sulfur dioxide and then reacting the sulfur dioxide with additional hydrogen sulfide to produce sulfur. It is important that the ratio of sulfur dioxide to hydrogen sulfide be maintained constant in the feed to the second reactor in order to produce a maximum amount of sulfur. Another example where the measurement of a ratio is desirable occurs in the alkylation of paraffins with olefins to produce gasoline. It is desirable that these two feed materials be supplied to the alkylation zone at a constant ratio.

In accordance with the present invention, apparatus is provided for analyzing fluid mixtures and for establishing output signals representative of the individual components or the ratio between selected components. In accordance with one aspect of this invention, a series of output signals from an analyzer are integrated over preselected time intervals, and output signals are established which are representative of the integregated values. Signals representative of the integrated values of one or more constituents of a fluid mixture are thus provided. In accordance with another aspect of this invention, output signals are provided which are representative of the ratio of signals that are representative of the individual constituents of fluid mixtures being analyzed. In accordance with still another aspect, an improved electrical signal integrator is provided.

Accordingly, it is an object of this invention to provide apparatus for measuring the concentrations of selected constituents in fluid mixtures.

Another object is to provide apparatus for establishing signals which are representative of the ratio of two input signals which are received in sequence.

Another object is to provide an improved integrator.

Other objects, advantages and features of the invention should become apparent from the following detailed description, taken in conjunction with the accompanying drawing in which:

FIGURE 2 is a graphical representation of operating features of the apparatus of FIGURE 1.

FIGURE 3 is a schematic circuit drawing of an amplifier employed in the apparatus of FIGURE 1.

FIGURE 5 is a schematic circuit drawing of a voltage-to-current transducer.

Figure 1:
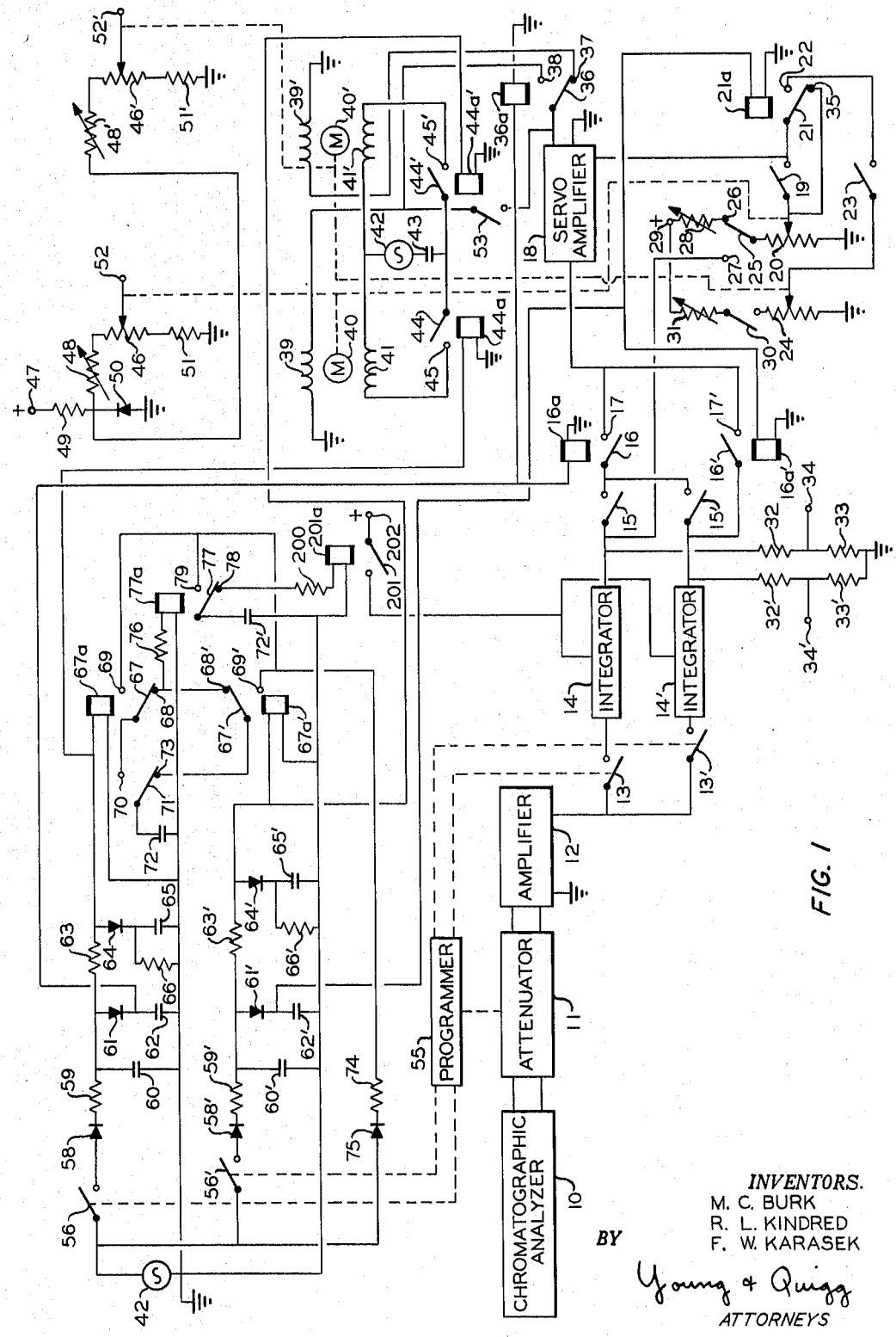
FIGURE 1 is a schematic circuit drawing of the apparatus of this invention.

Referring now to the drawing in detail and to FIGURE 1 in particular, there is shown a chromatographic analyzer 10 which provides a series of output signals which are representative of the individual constituents of a fluid mixture which is being analyzed. The output signals from analyzer 10 are applied through an attenuator circuit 11 to the input of an amplifier 12. Attenuator circuit 11 can be a plurality of voltage dividing networks to permit the individual output signals from analyzer 10 to be scaled by preselected amounts. The first output terminal of amplifier 12 is connected through a switch 13 to the input of a first integrator 14 and through a switch 13' to the input of a second integrator 14'. Switches 13 and 13' are closed selectively by a programmer 55 in the manner described hereinafter. The output of integrator 14 is connected through a switch 15 to a switch 16 which engages a terminal 17 when a relay coil 16a is energized. The output of integrator 14' is connected through a switch 15' to switch 16. The output of integrator 14' is also connected to a switch 16' which engages a terminal 17' when a relay coil 16a' is energized. Terminals 17 and 17' are connected at the first input of a servo amplifier 18. The second input of servo amplifier 18 is connected through a switch 19 to the contactor of a potentiometer 20. The second input of amplifier 18 is also connected to a switch 21 which engages terminals 22 and 35 when a relay coil 21a is energized and deenergized, respectively. Terminal 22 is connected through a switch 23 to the contactor of a potentiometer 24. Terminal 35 is connected to the contactor of potentiometer 20. The first end terminals of potentiometers 20 and 24 are connected to ground. The second end terminal of potentiometer 20 is connected to a switch 25 which is adapted to engage terminals 26 and 27 selectively. Terminal 26 is connected through a variable resistor 28 to a terminal 29 that is maintained at a positive potential. Terminal 27 is connected directly to the output of integrator 14. The second end terminal of potentiometer 24 is connected through a switch 30 and a variable resistor 31 to terminal 29.

The output of integrator 14 is also connected to ground through resistors 32 and 33 which are connected in series relationship. The junction between resistors 32 and 33 is connected to an output terminal 34. The output of integrator 14' is connected to ground through resistors 32' and 33' which are connected in series relationship. The junction between resistors 32' and 33' is connected to an output terminal 34'. Terminals 34 and 34' thus provide output signals representative of the integrated values of the signals from analyzer 10.

The first output terminal of servo amplifier 18 is connected to a switch 36 which is actuated by a relay coil 36a. Switch 36 engages terminals 37 and 38 when relay coil 36a is deenergized and energized, respectively. Terminals 37 and 38 are connected to ground through respective windings 39' and 39 of servo motors 40' and 40. These motors are reversible, two-phase induction motors. Corresponding first terminals of the second windings 41 and 41' of motors 40 and 40' are connected to the first terminal of an alternating current source 42. The second terminal of current source 42 is connected through a capacitor 43 to switches 44 and 44'. Switches 44 and 44' engage respective terminals 45 and 45' when relay coils 44a and 44a' are energized. Terminals 45 and 45' are connected to the second end terminals of respective motor windings 41 and 41'.

The drive shaft of motor 40 adjusts the positions of the contactors of potentiometers 46 and 20. The drive shaft of motor 40' adjusts the positions of the contactors of potentiometers 46' and 24. The first end terminal of potentiometer 46 is connected to a positive potential terminal 47 through an adjustable resistor 48 and a resistor 49. A rectifier 50 is connected between ground and the junction between resistors 48 and 49. The first end terminal of potentiometer 46' is connected to terminal 47 through an adjustable resistor 48' and resistor 49. The second end terminals of potentiometers 46 and 46' are connected to ground through respective resistors 51 and 51'. The contactors of potentiometers 46 and 46' are connected to respective output terminals 52 and 52'. Resistors 51 and 51' provide a zero offset in the output signals.

The relay coils thus far described are energized in sequence by means of programmer 55. Programmer 55 controls the closing of switches 56 and 56' in the sequence described hereinafter. Programmer 55 can be any suitable timing means known in the art, for example, such as the motor-driven cams and associated switches disclosed in U.S. Patent 3,049,908, issued on August 21, 1962, on copending application Serial No. 755,312, filed by Raymond L. Kindred and Marvin C. Burk on August 15, 1958. Switches 56 and 56' are connected to the first terminal of alternating current source 42, the second terminal of which is grounded. When switch 56 is closed, the first terminal of current source 42 is connected to the first terminal of a rectifier 58. The second terminal of rectifier 58 is connected to ground through resistor 59 and a capacitor 60. A rectifier 61 and a capacitor 62 are connected in series with one another and in parallel with capacitor 60. A resistor 63, a rectifier 64 and a capacitor 65 are connected in series with one another and in parallel with capacitor 60. A resistor 66 is connected in parallel with capacitor 65. Relay coils 16a and 36a are connected in parallel with capacitor 62. While two relay coils are illustrated in order to simplify the drawing, a single coil having two switches 16 and 36 normally is utilized. Relay coil 44a and a relay coil 67a are connected across rectifier 64 and capacitor 65. The circuit associated with switch 56' is identical to the circuit thus far described and corresponding elements are designated by like primed reference numerals.

Relay coil 67a actuates a switch 67 which engages terminals 68 and 69 when the relay coil is deenergized and energized, respectively. Switche 67 is connected to a terminal 70 which is adapted to be engaged by a switch 71. A capacitor 72 is connected between switch 70 and ground. Relay coil 67a' actuates a switch 67' which engages terminals 68' and 69' when the relay coil is deenergized and energized, respectively. Switch 67' engages a terminal 73 which also is adapted to be engaged by switch 71. Terminals 68 and 68' are connected through a resistor 76 and a relay coil 77a to ground. Relay coil 77a actuates a switch 77 which engages terminals 78 and 79 when the relay coil is deenergized and energized, respectively. Terminal 79 is connected to terminals 69 and 69'. A capacitor 72' is connected between switch 77 and ground. Terminal 78 is connected through a resistor 200 and a relay coil 201a to ground. Relay coil 201a actuates a switch 201 which connects a positive potential terminal 202 to integrators 14 and 14' to reset the integrators in the manner described hereinafter in detail.

In a first method of operation, the apparatus of FIGURE 1 provides two output signals that are representative of the integrals of two input signals which are received in sequence from chromatographic analyzer 10. A typical output signal from analyzer 10 can be of the type shown by curve 80 of FIGURE 2 which illustrates variations in the output voltage from the analyzer with respect to time. A first peak representative of a first component X in a fluid mixture arrives at a first time, and a second peak Y representative of a second component of the mixture arrives at a later time. Programmer 55 provides a first signal of the type shown by curve 81 which closes switch 13 for the time 81a which corresponds to peak X. A second signal 82 closes switch 13' for the time 82a which corresponds to peak Y.

In this first method of operation, switches 15, 23 and 30 are closed. Switches 15', 19 and 53 are open. Switch 25 engages terminal 26, and switch 71 engages terminal 73. As previously mentioned, signals X and Y are applied to respective integrators 14 and 14' because switches 13 and 13' are closed in sequence by respective pulses 81a and 82a. Pulse 83a from programmer 55 then closes switch 56. This energizes relay coils 16a and 36a. The output of integrator 14 is thus applied to servo amplifier 18, the output of which is applied to motor winding 39. A short time later capacitor 65 becomes charged through 63 and 64 to energize relay coils 44a and 67a. Closure of switch 44 applies current to motor winding 41 to energize motor 40 so as to permit adjustment of the contactor of potentiometers 46 and 20 in accordance with the signal from integrator 14. At the end of signal 83a, switch 56 opens. This deenergizes relay coils 44a and 67a first, and then deenergizes relay coils 16a and 36a after capacitor 62 is deenergized. Thereafter, a pulse 84a from programmer 55 closes switch 56'. The output from integrator 14' is thus applied through servo amplifier 18 to energize motor 40' to adjust the contactor of potentiometer 46' in the same manner as described above with respect to integrator 14.

During the time that relay coil 67a' is energized, capacitor 72 is charged from rectifier 75 through resistor 74 and switch 71. After relay coil 67a' becomes deenergized, the charge on capacitor 72 energizes relay coil 77a to charge capacitor 72' from rectifier 75. After relay coil 77a becomes deenergized, the charge on capacitor 72' energizes relay coil 201a to close switch 201. Thus, the reset pulse applied to integrators 14 and 14' is delayed for a preselected time interval after the integrator outputs are "read."

The foregoing operation thus establishes a first output signal between terminal 52 and ground which is representative of the integrated value of pulse X and a second output between terminal 52' and ground which represents the integrated value of pulse Y. A second method of operation is one wherein an output signal is provided which is representative of the ratio of the integrated values of the two pulses. In order to describe this operation, the total resistances above and below the contactor of potentiometer 20 are designated as resistances $R_1$ and $R_2$, respectively. The total resistances above and below the contactor of potentiometer 46 are designated as resistances $R_5$ and $R_4$, respectively. The current flowing from the output of integrator 14 through resistor $R_1$ and resistor $R_2$ to ground is designated $i_1$. The current flowing from the output of integrator 14' through the input of servo amplifier 18 and resistor $R_2$ to ground is designated $i_2$. The following equations thus become $$E_1 = i_1(R_1+R_2)+i_2 R_2$$

and $$E_2 = i_1 R_2 + i_2 R_2$$

where $E_1$ is the potential drop across $R_1$ and $R_2$, and $E_2$ is the potential drop across $R_2$.

The ratio can be expressed:

$$\frac{E_1}{E_2} = \frac{i_1(R_1+R_2)+i_2R_2}{i_1R_2+i_2R_2}$$

At null, $i_2=0$, so that:

$$\frac{E_1}{E_2} = \frac{R_1+R_2}{R_2} = \frac{R_5+R_4}{R_4} = \frac{E_3}{E_4}$$

where $E_3$ is the potential drop across $R_5$ and $R_4$, and $E_4$ is the potential drop across $R_4$. This relationship is established because of the mechanical linkage between the contactors of potentiometers 20 and 46. This can be expressed:

$$E^4 = \frac{E_2(E_3)}{E_1} = \frac{E_2}{kE_1}$$

where $k$ is a constant due to the constant potential across potentiometer 46 from terminal 47.

When the apparatus of FIGURE 1 is employed to measure the ratio of the integrated values of two input signals, such as X and Y, switches 15', 19 and 53 are closed. Switches 15, 30 and 23 are open. Switch 25 engages terminal 27, and switch 71 engages terminal 70. The two signals X and Y are applied to respective integrators 14 and 14' in the manner previously described. Gating pulse 83a closes switch 56 in the manner previously described. The balancing operation is performed by motor 40 which adjusts the contactors of potentiometers 20 and 46 until the two signals compared by servo amplifier 18 are equal. At this time the output signal between terminals 52 and 52' is representative of the ratio of the integrated values of the two input signals X and Y, except for the zero offset introduced by resistor 51.

In a third method of operation where only a single output is desired, switches 15', 19 and 53 are closed and switches 15, 30 and 23 are open. Switch 25 engages terminal 26, and switch 71 engages terminal 70. The single output signal is applied to integrator 14' at this time by pulse 82a. Pulse 81a is not utilized. The output signal from integrator 14' is transferred to potentiometers 20 and 46 by motor 40 in response to the gate pulse 83a, as previously described.

A suitable servo amplifier for use in the circuit of FIGURE 1 is illustrated schematically in FIGURE 3. The two input terminals 90 and 91 are connected to a switch 92 and to the center tap of the primary winding 93 of a transformer 94, respectively. The end terminals of transformer winding 93 are connected to respective contactors 95 and 96. A coil 97, which is connected across an alternating current source 28, is positioned with respect to switch 92 so that the application of current to coil 97 results in switch 92 alternatingly engaging contacts 95 and 96. An input D.C. signal is thus converted to a corresponding A.C. signal which appears across the end terminals of secondary winding 98. One end terminal of transformer winding 98 is connected to ground, and the second end terminal is connected through a capacitor 100 and a resistor 101 to the base of a first transistor 102. Transistor 102 forms the first stage of an amplifier circuit which includes additional transistors 103, 104 and 105. The emitters of transistors 102, 103 and 104 are connected directly to ground, and the emitter of transistor 105 is connected to ground through a resistor 106. The collector of transistor 105 is connected to a terminal 107 which is maintained at a positive potential; the collector of transistor 104 is connected through a resistor 108 to terminal 107; the collector of transistor 103 is connected through a resistor 109 to terminal 107; and the collector of transistor 102 is connected through resistors 110 and 111 to terminal 107. The junction between resistors 110 and 111 is connected to ground through a capacitor 112. The collector of transistor 102 is connected to the base of transistor 103 through a rectifier 113, and the collector of transistor 103 is connected to the base of transistor 104 through a rectifier 114. Rectifiers 113 and 114 are employed as forward conduction diodes to obtain an A.C. drop to raise the collector voltages of transistors 102 and 103. The collector of transistor 103 is connected to the collector of transistor 104 through a capacitor 115. The collector of transistor 104 is connected directly to the base of transistor 105.

The emitter of transistor 105 is connected to the base of transistor 102 through series connected resistors 116 and 117. The junction between these resistors is connected to ground through a resistor 118. The emitter of transistor 105 is also connected to the base of transistor 102 through a Zener diode and resistors 120 and 121 which are connected in series relationship. The junction between resistors 120 and 121 is connected to ground through a capacitor 122. The network comprising elements 119, 120, 121 and 122 provides a D.C. feedback path in the amplifier which results in direct current stabilization of the amplifier. The alternating current gain of the amplifier is stabilized by the feedback network which comprises resistors 116, 117 and 118.

The emitter of transistor 105 is connected through a capacitor 123 and diodes 126 and 127 to ground. These diodes serve to limit the output of the amplifier circuit. The junction between capacitor 123 and diode 126 is connected to the base of a transistor 125. A resistor 128 is connected in parallel with diodes 126 and 127. A rectifier 129 is connected between the emitter of transistor 125 and the base thereof. The collector of transistor 125 is connected to the base of a transistor 130. The collector of transistor 130 is connected to ground through a resistor 131. A resistor 132 is connected between the base of transistor 130 and first terminals of rectifiers 133 and 134. The second terminals of rectifiers 133 and 134 are connected to the respective terminals of an alternative current source 135 so as to provide a positive operating potential. The collector of transistor 130 is connected to the base of transistor 136. The emitter of transistor 136 is connected directly to an output terminal 137. The emitter of transistor 136 is also connected to ground through series connected resistors 138 and 139 and capacitor 190. The junction between resistors 138 and 139 is connected by a resistor 191 to first terminals of rectifiers 192 and 193. The second terminals of these rectifiers are connected to the respective output terminals of current source 135 so as to provide a negative operating potential. The amplifier circuit following capacitor 123 provides suitable power to operate motors 40 and 40'.

Figure 4:
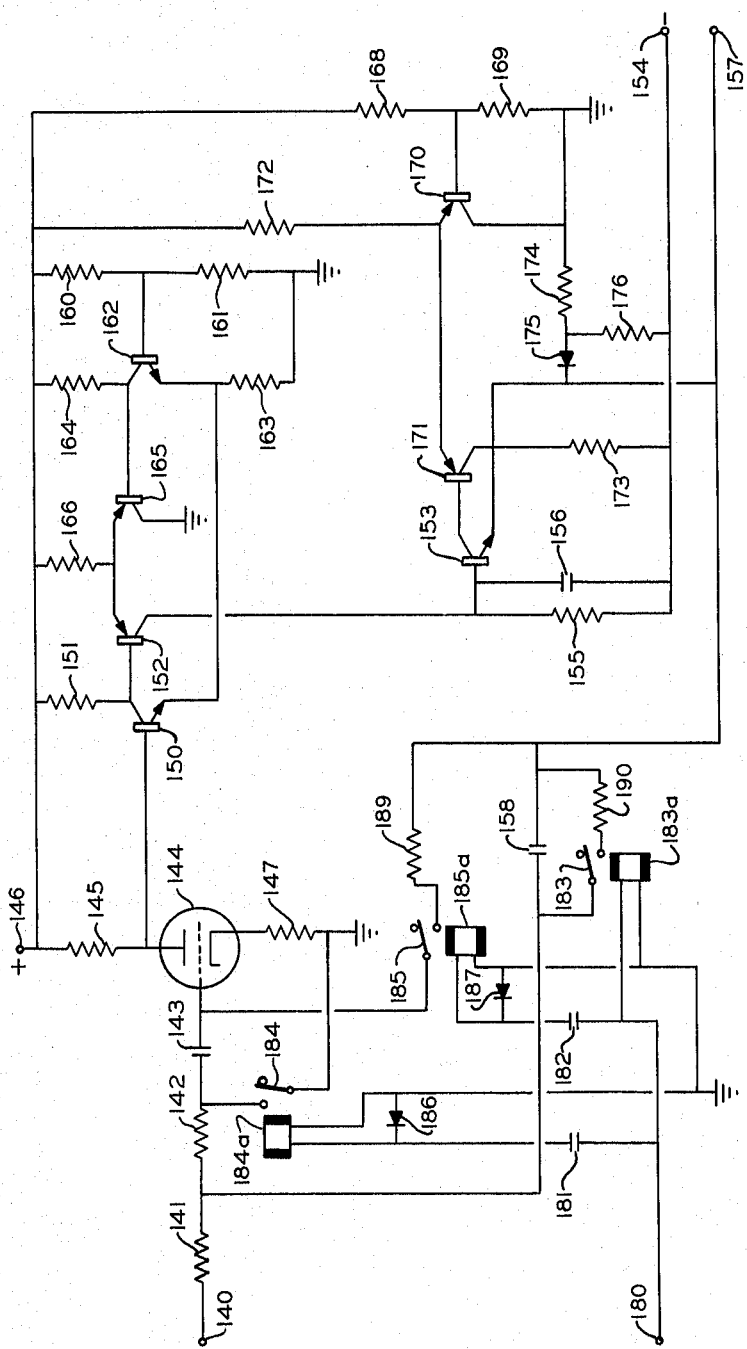
FIGURE 4 is a schematic circuit drawing of an integrator employed in the apparatus of FIGURE 1.

The improved integrator of this invention which is particularly adapted for use in the circuit of FIGURE 1 is illustrated schematically in FIGURE 4. This integrator comprises basically a direct current operational amplifier having a capacitor in the feedback network thereof. The input terminal 140 of the integrator is connected through resistors 141 and 142 and a capacitor 143 to the control grid of a tube 144. The anode of tube 144 is connected through a resistor 145 to a terminal 146 which is maintained at a positive potential. The cathode of tube 144 is connected to ground through a resistor 147. The anode of tube 144 is connected to the base of a transistor 150. The collector of transistor 150 is connected to terminal 146 through a resistor 151 and directly to the base of a transistor 152. The collector of transistor 152 is connected to the base of a transistor 153. The base of transistor 153 is connected to a terminal 154, which is maintained at a negative potential, through a resistor 155 which is shunted by a capacitor 156. The emitter of transistor 153 is connected to the output terminal 157 of the integrator circuit. A capacitor 158 is connected between output terminal 157 and the junction between input resistors 141 and 142. The circuit thus far described constitutes the basic direct current amplifier having capacitor 158 in the feedback network thereof.

A number of additional transistors are associated with the amplifier to provide the desired voltage gain and output current. Resistors 160 and 161 are connected between terminal 146 and ground. The junction between these resistors is connected to the base of a transistor 162. The emitters of transistors 150 and 162 are connected to ground through a common resistor 163. The collector of transistor 162 is connected through a resistor 164 to terminal 146 and directly to the base of a transistor 165. The emitters of transistors 152 and 165 are connected to terminal 146 through a common resistor 166. The collector of transistor 165 is connected directly to ground.

Voltage dividing resistors 168 and 169 are connected between terminal 146 and ground. The junction between these resistors is connected to the base of a transistor 170. The emitters of transistors 170 and 171 are connected to terminal 146 through a common resistor 172. The emitter of transistor 153 and the collector of transistor 171 are connected to terminal 154 through a common resistor 173. The collector of transistor 170 is connected directly to ground and to the collector of transistor 171 through a resistor 174 and a rectifier 175. The junction between resistor 174 and rectifier 175 is connected through a resistor 176 to terminal 154. The network of rectifier 175 and resistors 174 and 176 limits the integrator output in the negative direction to assure that the voltage ratings of the transistors are not exceeded in the event the output of amplifier 12 should be connected with the wrong polarity.

As previously mentioned, closure of switch 201 in FIGURE 1 results in a positive potential from terminal 202 being applied to the integrators of FIGURE 1. This potential is applied to terminal 180 of FIGURE 4, for example. Terminal 180 is connected to the first terminals of capacitors 181 and 182 and to one terminal of a relay coil 183a. The second terminals of capacitors 181 and 182 are connected to first terminals of respective relay coils 184a and 185a. The second terminals of relay coils 183a, 184a and 185a are connected to ground. Rectifiers 186 and 187 are connected in parallel with respective relay coils 184a and 185a. A switch 184, which is closed when relay coil 184a is energized, is connected between ground and the junction between resistor 142 and capacitor 143. A resistor 189 and a switch 185 are connected between output terminal 157 and the control grid of tube 144. Switch 185 is closed when relay coil 185a is energized. Closure of a switch 183 by relay coil 183a being energized connects a resistor 190 in parallel with capacitor 158.

The circuit described above provides automatic zero adjustment. The pulse from terminal 180 energizes relay coil 183a to close switch 183. This discharges integrating capacitor 158. The pulse from terminal 180 also energizes relay coils 184a and 185a to close respective switches 184 and 185. Time delay circuits comprising capacitors 181 and 182 and rectifiers 186 and 187 keep relay coils 184a and 185a energized for preselected time intervals. Capacitor 181 is larger than capacitor 182 so that relay coil 185a is deenergized first. Initially, capacitor 143 charges through resistor 189 until the output potential equals the potential across capacitor 143 (grid to ground potential of tube 144). Because of the large voltage gain of the amplifier (of the order of 1000), the voltage across capacitor 143 is nearly equal to the zero offset of tube 144. Therefore, the charge stored on capacitor 143 compensates for the zero error of tube 144 when the input signal is applied to the grid of tube 144 through capacitor 143.

In one specific embodiment of the integrator of this invention, capacitors 143 and 158 were 0.1 and 2 microfarads, respectively. Resistors 142 and 189 were 1 megohm each. Resistor 190 was 10,000 ohms. Input resistor 141 is selected for the particular analysis, considering the amplitude and time duration of the analyzer output signals.

The circuit illustrated in FIGURE 5 is adapted to convert the output potentials from terminals 52 and 52′ of FIGURE 1 into corresponding currents to actuate control instruments. Terminal 52, for example, is connected to the base of a first transistor 205. The emitter of transistor 205 is connected to the emitter of a second transistor 206. The emitters of transistors 205 and 206 are connected to a negative potential terminal 207 through a resistor 208. The collector of transistor 205 is connected directly to a positive potential terminal 209. A resistor 210 is connected between terminal 209 and the collector of transistor 206. A resistor 212 is connected between the base of transistor 206 and ground. The collector of transistor 206 is connected to the base of a transistor 213. The collector of transistor 213 is connected directly to the collector of a transistor 214 and to the first input of a controller 215. The second input of controller 215 is connected to a terminal 216 which is maintained at a positive potential. The emitter of transistor 214 is connected directly to the base of transistor 206. The emitter of transistor 213 is connected through a resistor 217 to the base of transistor 206.

The input potential applied to terminal 52 normally is of the order of 2 to 10 volts, for example. The illustrated circuit converts this potential into a corresponding output current which flows through the input circuit of controller 215 which can be a conventional pneumatic or electrical controller. In one specific embodiment of this circuit, the following components were employed:

| Resistor | Value (ohms) | Terminal | Potential (volts) | Transistor | Type |
| --- | --- | --- | --- | --- | --- |
| 208 | 15,000 | 207 | −32 | 205, 206 | 2N619 |
| 210 | 22,000 | 209 | +32 | 213 | 2N498 |
| 217 | 5,600 | 216 | +80 | 214 | 2N1048 |
| 212 | 200–2,000 | | | | |

The output current can be adjusted by varying resistor 212. For example, the output current range is illustrated in the following table with different values of resistor 212, assuming the input potential varies from 2 to 10 volts.

| Resistance (ohms): | Current (milliamperes) |
| --- | --- |
| 200 | 10–50 |
| 500 | 4–20 |
| 2,000 | 1–5 |

In view of the foregoing description, it should be evident that improved apparatus is provided in accordance with this invention for analyzing samples and for providing signals representing ratios of input signals. While the invention has been described in conjunction with a presently preferred embodiment, it should be evident that it is not limited thereto.

What is claimed is:

1. An analysis system comprising an analyzer adapted to provide output signals in sequence; first and second signal integrators; first and second switching means to connect the output of said analyzer to the inputs of said first and second integrators, respectively; first and second potentiometers; means applying voltages across the end terminals of said potentiometers; first and second servo motors having the drive shafts thereof connected to the contactors of said first and second potentiometers, respectively; a servo amplifier; third switching means to connect the outputs of said integrators selectively to the input of said servo amplifier; means connecting the output of said servo amplifier to said first and second servo motors; a source of current; fourth and fifth switching means to connect said source of current to said first and second servo motors, respectively, to permit same to be energized; timing means to provide first, second, third and fourth output signals in sequence; means to apply said first and second signals to said first and second switching means, respectively, to actuate same; means to apply said third signal to said fourth switching means to actuate same, said third switching means connecting said first integrator to said servo amplifier at such time; means to apply said fourth signal to said fifth switching means to actuate same, said third switching means connecting said second integrator to said servo amplifier at such time; a source of potential; sixth switching means to connect said source of potential to said integrators to reset same; and delay means responsive to said fourth signal to actuate said sixth switching means at a time after said fourth signal is established.

2. An analysis system comprising an analyzer adapted to provide output signals in sequence; first and second signal integrators; first and second switching means to connect the output of said analyzer to the inputs of said first and second integrators, respectively; a potentiometer; means for applying a voltage across the end terminals of said potentiometer; a servo motor having the drive shaft thereof connected to the contactor of said potentiometer; a servo amplifier having first and second input terminals; third switching means to connect the output of said second integrator to the first input terminal of said amplifier; means connecting the contactor of said potentiometer to the second input terminal of said amplifier; means connecting one end terminal of said potentiometer to the output of said first integrator; timing means to provide first, second and third output signals in sequence; means to apply said first and second signals to said first and second switching means, respectively, to actuate same; means responsive to said third signal to actuate said third switching means and to energize said servo motor in response to the output of said servo amplifier; a source of potential; and delay means responsive to said third output signal to connect said source of potential to said integrators to reset same at a preselected time after said third output signal is provided.

3. An analysis system comprising an analyzer adapted to provide output signals in sequence; first and second signal integrators, each of said integrators comprising a direct current amplifier having first and second input terminals and first and second output terminals, third and fourth input terminals, said second and fourth input terminals being common, first and second resistors and a first capacitor connected in series between said third terminal and said first input terminal, a second capacitor connected between said first output terminal and the junction between said first and second resistors, and a third resistor; first and second switching means to connect the output of said analyzer to the inputs of said first and second integrators, respectively, said integrator inputs being between said third and fourth input terminals; first and second potentiometers; means applying voltages across the end terminals of said potentiometers; first and second servo motors having the drive shafts thereof connected to the contactors of said first and second potentiometers, respectively; a servo amplifier; third switching means to connect the outputs of said integrators selectively to the input of said servo amplifier; means connecting the output of said servo amplifier to said first and second servo motors; a source of current; fourth and fifth switching means to connect said source of current to said first and second servo motors, respectively, to permit same to be energized; timing means to provide first, second, third and fourth output signals in sequence; means to apply said first and second signals to said first and second switching means, respectively, to actuate same; means to apply said third signal to said fourth switching means to actuate same, said third switching means connecting said first integrator to said servo amplifier at such time; means to apply said fourth signal to said fifth switching means to actuate same, said third switching means connecting said second integrator to said servo amplifier at such time; a source of potential; sixth switching means to connect said source of potential to said integrators to reset same, each of said integrators including means responsive to said source of potential to (1) discharge said second capacitor, (2) connect said third resistor between said first output terminal and said first input terminal, and (3) connect the junction between said second resistor and said first capacitor to said second input terminal, and thereafter to (4) disconnect said third resistor and (5) disconnect the junction between said second resistor and said first capacitor from said second input terminal in the order named; and delay means responsive to said fourth signal to actuate said sixth switching means at a time after said fourth signal is established.

4. An analysis system comprising an analyzer adapted to provide output signals in sequence; first and second signal integrators, each of said integrators comprising a direct current amplifier having first and second input terminals and first and second output terminals, third and fourth input terminals, said second and fourth input terminals being common, first and second resistors and a first capacitor connected in series between said third terminal and said first input terminal, a second capacitor connected between said first output terminal and the junction between said first and second resistors, and a third resistor; first and second switching means to connect the output of said analyzer to the inputs of said first and second integrators, respectively, said integrator inputs being between said third and fourth input terminals; a potentiometer; means applying a voltage across the end terminals of said potentiometer; a servo motor having the drive shaft thereof connected to the contactor of said potentiometer; a servo amplifier having first and second input terminals; third switching means to connect the output of said second integrator to the first input terminal of said amplifier; means connecting the contactor of said potentiometer to the second input terminal of said amplifier; means connecting one end terminal of said potentiometer to the output of said first integrator; timing means to provide first, second and third output signals in sequence; means to apply said first and second signals to said first and second switching means, respectively, to actuate same; means responsive to said third signal to actuate said third switching means and to energize said servo motor in response to the output of said servo amplifier; a source of potential; and delay means responsive to said third output signal to connect said source of potential to said integrators to reset same at a preselected time after said third output signal is provided, each of said integrators including means responsive to said source of potential to (1) discharge said second capacitor, (2) connect said third resistor between said first output terminal and said first input terminal, and (3) connect the junction between said second resistor and said first capacitor to said second input terminal, and thereafter to (4) disconnect said third resistor and (5) disconnect the junction between said second resistor and said first capacitor from said second input terminal in the order named.

5. An integrator comprising a direct current amplifier having first and second input terminals and first and second output terminals; third and fourth input terminals, said second and fourth terminals being common; first and second resistors and a first capacitor connected in series between said third terminal and said first input terminal; a second capacitor connected between said first output terminal and the junction between said first and second resistors; a third resistor; and means to (1) discharge said second capacitor, (2) connect said third resistor between said first output terminal and said first input terminal, and (3) connect the junction between said second resistor and said first capacitor to said second input terminal, and thereafter to (4) disconnect said third resistor and (5) disconnect the junction between said second resistor and said first capacitor from said second input terminal in the order named.

6. The integrator of claim 5 wherein said means to discharge said second capacitor comprises a switch and a resistor connected in series with one another and in parallel with said second capacitor, and means to close said switch for a period of time which terminates after the time said third resistor is disconnected.

7. The integrator of claim 6 wherein said means to connect and disconnect comprises second and third switches, first and second relay coils to close said second and third switches, respectively, when energized, fifth and sixth terminals, means to apply a voltage pulse between said fifth and sixth terminals, third and fourth capacitors, means connecting said third capacitor in series with said first relay coil across said fifth and sixth terminals, means connecting said fourth capacitor in series with said second relay coil across said fifth and sixth terminals, a first rectifier connected in parallel with said first relay coil, and a second rectifier connected in parallel with said second relay coil.

References Cited by the Examiner

UNITED STATES PATENTS

| | | | |
|---|---|---|---|
| 2,750,110 | 6/1956 | Och | 235—183 |
| 2,891,725 | 6/1959 | Blumenthal et al. | 235—183 |
| 2,965,300 | 12/1960 | Radley | 235—193 |
| 2,971,697 | 2/1961 | Harter | 235—193 |
| 3,005,673 | 10/1961 | Burhans | 235—151 |
| 3,049,908 | 8/1962 | Kindred et al. | 235—151 |

MALCOLM A. MORRISON, *Primary Examiner.*